United States Patent [19]

Nelson

[11] Patent Number: 4,871,948

[45] Date of Patent: Oct. 3, 1989

[54] MEMORY MAPPED DEFLECTION CORRECTION SYSTEM

[75] Inventor: Larry A. Nelson, Albuquerque, N. Mex.

[73] Assignee: Honeywell Inc., Minneapolis, Minn.

[21] Appl. No.: 268,872

[22] Filed: Nov. 8, 1988

[51] Int. Cl.⁴ .................. H01J 29/70; H01J 29/76
[52] U.S. Cl. ................................................ 315/368
[58] Field of Search ........................................ 315/368

[56] References Cited

U.S. PATENT DOCUMENTS

| | | | |
|---|---|---|---|
| 4,203,051 | 5/1980 | Hallett et al. | 315/368 |
| 4,203,054 | 5/1980 | Sowter | 315/368 |
| 4,316,211 | 2/1982 | Mackey et al. | 315/368 |
| 4,401,922 | 8/1983 | Kamata et al. | 315/368 |
| 4,422,019 | 12/1983 | Meyer | 315/368 |
| 4,620,136 | 10/1986 | Bolger | 315/368 |
| 4,672,275 | 6/1987 | Ando | 315/368 |
| 4,680,510 | 7/1987 | Spieth et al. | 315/368 |
| 4,687,973 | 8/1987 | Holmes et al. | 315/368 |

Primary Examiner—Theodore M. Blum
Attorney, Agent, or Firm—Haugen and Nikolai

[57] ABSTRACT

A memory mapped deflection correction system for use in correcting misconvergence in color CRTs. The invention utilizes predetermined convergence values by storing these values in an onboard memory. Apparatus for spatial domain interpolation interpolates the stored values into intermediate convergence correction values. The intermediate values are reconstructed into analog convergence signals using a reconstruction means, including an analog to digital converter and an amplifier inherently including a time domain filter. The amplifier then drives the convergence yoke of the CRT.

20 Claims, 8 Drawing Sheets

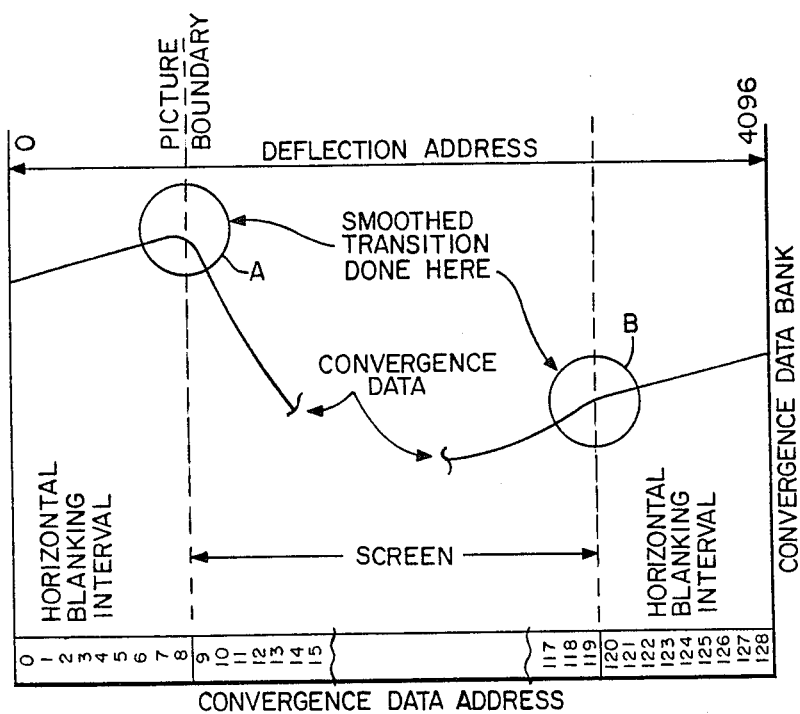
FIG. 10
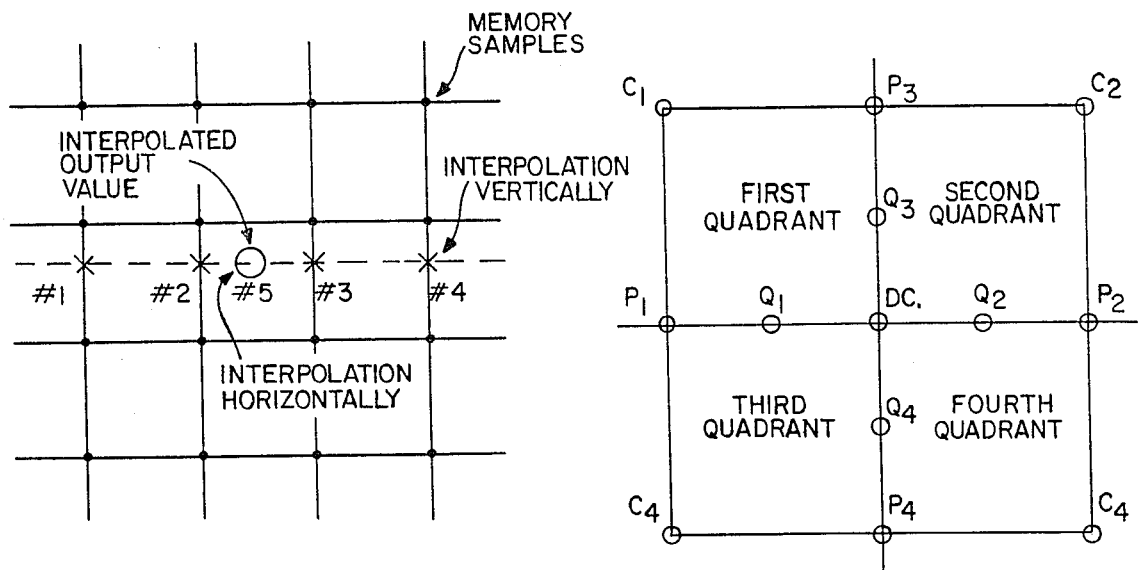
FIG. 11
FIG. 14

MEMORY MAPPED DEFLECTION CORRECTION SYSTEM

This invention was made with United States Government support and the United States Government has certain rights therein.

BACKGROUND OF THE INVENTION

The present invention relates generally to color cathode ray tube displays formed either by conventional shadowmask technology or by optical combination of different color display fields in a projection device. More particularly, the invention relates to a memory mapped deflection correction system for use in such cathode ray tube displays.

Certain aircraft cockpit displays use a delta-gun shadow mask cathode ray tube (CRT). The delta-gun CRT has the best performance of any shadow-mask based color CRT because it operates with a uniform deflection field which preserves the round spot and provides the largest possible focus barrel within a given neck diameter. These characteristics result in nearly equal resolution on all axes of the display. That is, lines written on different angles are all nearly equal in width. Because of physical restrictions characteristic of such CRTs, none of the electron guns fires through the center of deflection. Instead they are spaced equally around the geometric central axis of the CRT, one gun every 120 degrees. The consequence of not passing through the center of deflection is that during deflection, each of the three electron guns encounters a slightly different deflection. This difference in deflection introduces error in the ability to converge the CRT beams. Second order effects cause this error to be different in different quadrants of the CRT and to vary from one CRT assembly to another. This misconvergence effect is apparent on the CRT whenever a secondary color is drawn (secondary colors are any color produced by a combination of primary colors).

Suppose, for example, that a yellow line is being drawn. Yellow is produced by the superposition of red and green primary luminance. If the red and green lines perfectly overlay, and each line is about 0.021 inches wide, then a yellow line which is 0.021 inches wide results. Because of misconvergence, these lines may offset, for example, by about 0.002 inches. The resultant line, viewed from a distance of say 19 inches, is a 0.023 inches wide yellow line. No color fringing would be observed for this amount of misconvergence but the resolution capability of the display on secondary colors would be degraded. For larger convergence errors, e.g., 0.018 inches, there is loss of resolution and color fringing. Color fringing is a breakup of the chromatic characteristic of the line into red, yellow, and green components. For some applications, misconvergence anywhere on the CRT cannot exceed 0.010 inches. This is an amount which, in one analog convergence system, requires 52 potentiometers to allow appropriate adjustment of the amounts of correction waveforms in each of 4 quadrants of the CRT display. A description of a method of doing this type of analog adjustment is contained in U.S. Pat. No. 4,524,307.

Such analog approaches consume space, power and parts, and reduce the reliability of the display. Such disadvantages limit the attractiveness of the delta gun CRT when compared, for example, to an in-line CRT. Except for the convergence problem, delta gun technology would be the clear choice for most applications based on its performance and simplicity. In addition to the problems inherent after the display is converged (but not perfectly converged), there are the problems associated with accomplishing that convergence. In the system described in U.S. Pat. No. 4,524,307, a technician must access a group of potentiometers and adjust them while observing the display with a visual aid (required to observe the amount of misconvergence) in order to achieve convergence. Besides being physically difficult for the technician, it is time consuming and, therefore, costly. These alignment difficulties are compounded by interaction within the electron gun convergence assemblies which causes the adjustments to interfere with one another, resulting in an iterative adjustment requirement to compensate for such interference.

The present invention solves the prior art difficulties by using a computer to calculate correction waveforms based upon keyboard selected correction coefficient magnitudes. This computed correction data is fed into a non-volatile memory in the display, e.g., via a 1553 port into an electrically erasable read only memory (EPROM). Space and power are decreased using a custom integrated circuit which is made practical through the basic digital design of the invention's convergence correction architecture. The invention takes advantage of the capabilities of this integrated circuit design to increase the processing power of the system with respect to the stored convergence data and, therefore, reduce the storage size and cost over other known digital systems. The storage in memory of specific composite correction waveforms precludes the necessity for on-board correction waveform generators as is disclosed in the above-referenced analog approach. Thus, the circuitry required is greatly reduced.

Because of the digital nature of the convergence waveform generation process of the invention, adjustments for a display can be preset to nominal values before the alignment process begins. The invention uses a digital convergence algorithm whereby interaction between convergence adjustments caused by the electron gun and convergence assembly design are subtracted out before the convergence corrections selected by the aligner are loaded into memory. Thus, from the point of view of the person accomplishing the alignment, there is little interaction between adjustments to various locations on the CRT.

Some convergence control techniques used in the past have implemented digital methods of convergence. For example, U.S. Pat. No. 4,385,259 to Chase, et al. teaches an apparatus for providing precise convergence compensation in a shadow mask type color CRT display. In the Chase device coarse compensation is provided by the coefficients of primary terms $X^2$, $Y_2$ of the beam's longitudinal and vertical position polynomial in analog format, and fine compensation is provided by digital programmable read only memories (PROMs). The fine compensation done by Chase is representative of the precise values of the coefficients of the remaining terms of the polynomials, and a digital to analog converter converts the fine compensation to an analog format. The coarse and fine data are then summed together and applied to the convergence correction coils of the CRT. Chase, however, does not address the important problem of aliasing caused by undersampling of correction waveforms inherent in such a digital convergence implementation. That is, adjustments made in one portion of the CRT are not independent using the Chase technique, making the systems very hard to adjust. The invention overcomes this problem by determining the proper sampling requirements for accurate waveform reconstruction. The Chase system resulted in adjustments that are not independent because the sampling requirements for reconstructing waveforms in such a digital system require either large amounts of memory or the application of interpolation techniques as taught in the present invention and not in the prior art. Crosstalk precorrection is an additional advantage of the digital system taught in this invention.

SUMMARY OF THE INVENTION

The invention is a memory mapped deflection correction system for use in correcting misconvergence in color CRTs. The invention utilizes predetermined convergence values by storing these values in an on-board memory. Means for spatial domain interpolation interpolates the stored values into intermediate convergence correction values. The intermediate values are reconstructed into analog convergence signals using a reconstruction means, including an analog to digital converter and an amplifier inherently including a time domain filter. The amplifier then drives the convergence yoke of the CRT.

It is one object of the invention to provide a convergence means which is spatially dependent.

It is another object of the invention to minimize the amount of memory required for digital convergence of a color CRT through preprocessing of convergence signals.

It is yet another object of the invention to reduce the voltage and power required for the convergence output amplifier through minimizing its required slew rate by preprocessing convergence correction signal transitions throughout the retrace interval.

It is another object of the invention to provide a convergence system which works uniformly for stroke, hybrid or raster modes.

Other features, advantages and objects of the invention will become apparent through the description, claims and drawings herein where like numerals refer to like elements.

BRIEF DESCRIPTION OF THE DRAWINGS

FIG. 10 is a graphic representation of the results of smoothing techniques employed by the invention.

FIG. 11 graphically illustrates the technique of cubic spline interpolation as employed in an alternate embodiment of the invention.

FIG. 14 graphically illustrates one example employing the invention wherein components of the composite convergence correction waveform are independent on a CRT screen.

DESCRIPTION OF THE PREFERRED EMBODIMENT

Figure 1:
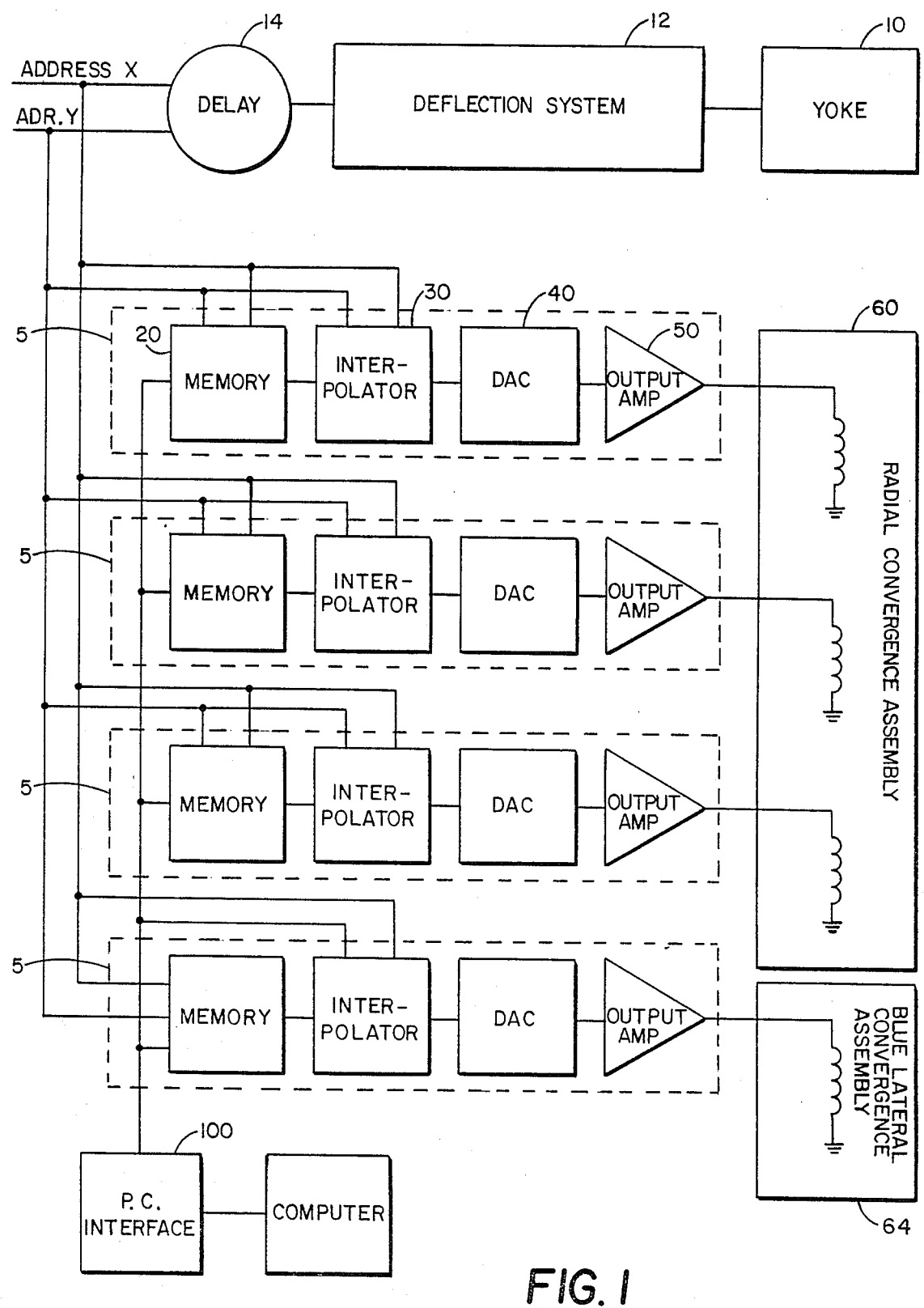
FIG. 1 shows a block diagram of one embodiment of a memory mapped deflection correction system.

FIG. 1 shows a block diagram of one embodiment of the invention which is designed for a delta-gun color CRT. One skilled in the art will recognize that the invention is not limited in application solely to such CRTs, but may be used in systems employing other types of CRTs including major systems using projection CRTs. However, for the purposes of describing the invention, the embodiment of FIG. 1 will serve as an illustrative example. The memory mapped deflection correction system or convergence system shown in FIG. 1 comprises a plurality of replicated electronic circuits corresponding to the number of color convergence axes used to correct the CRT. In the embodiment shown in FIG. 1, four of such replicated functional electronic blocks 5, are shown within dotted lines. Each of these functional electronic blocks 5 include a memory means for storing digital information 20, a means for interpolating digital information 30 which receives digital information from the memory means 20, a means for converting digital information to analog electronic signals 40, and a means for amplifying and filtering analog signals 50. The memory means 20 and interpolation means 30 are discussed in greater detail below with reference to FIG. 2.

Still referring to FIG. 1, further included in the embodiment of the convergence system shown in FIG. 1 is a means 100 for interfacing with an external computer. Such an external computer (not shown) can conveniently be any commercially available personal computer with sufficient storage capabilities to implement the software discussed herein below. Also shown in FIG. 1 are several elements which are contained within a typical delta-gun CRT including a yoke 10, a deflection system 12, a delay circuit 14, a radial convergence assembly 60, and a blue lateral convergence assembly 64.

Each of the functional electronic blocks 5 corresponds to a different color convergence axis in the CRT. There is one functional electronic block 5 for each of the red radial, blue radial, green radial and blue lateral color convergence axes. The memory means 20, interpolator means 30, digital to analog conversion means 40 and amplifier means 50 cooperate to generate a convergence signal from data stored in the memory means 20. The generated data represents the convergence requirement for different points on the CRT screen for that particular convergence assembly (See FIG. 14) and CRT.

Data initially stored in the memory means 20 is generated by an external computer and input into the memory via interface means 100. Once all of the memory means 20 are programmed with the externally generated convergence data, the external computer is disconnected. Unless further adjustment is needed, whenever the system is subsequently operated a convergence correction of the CRT will automatically be accomplished using the data stored in memory means 20, by interpolating in interpolation means 30 and reconstructing the analog signal through digital analog conversion means 40 and amplifier means 50 as explained in more detail below.

Generally in operation, the convergence data generated by the separate computer is based upon measurement or observation of convergence errors on the CRT face plate. This data is stored in memory means 20 and is accessed for numerical processing by the interpolation means 30 which then sends the interpolated digital information to digital to analog conversion means 40. The combination of digital to analog conversion means 40 and output amplifier 50 is to, in effect, perform a reconstruction of the analog signal represented by the digital information stored in memory means 20 and to provide a convergence waveform to one of the axes of the convergence assemblies 60 or 64, as the case may be. The convergence value provided by amplifier means 50 depends upon the screen position of the electron beam associated with each convergence axis. The electron beams (not shown) are deflected across the CRT screen in either a raster or stroke mode. The deflection speed may vary depending upon the intensity of display desired or in the case of raster, the scanning standard selected. Thus, the signal generated at the input to the convergence output amplifier 50 is a continuous analog signal. If the generation of the convergence signal is done according to the rules established by the Nyquist sampling theorem, there will be no difference between the convergence signal generated based upon the stored data in a computer memory, such as memory means 20, or the signal generated using a purely analog system of correction waveform synthesis.

In one application of the invention, a technician may measure convergence errors visually on the CRT display. The technician can then input corrections into the system using the computer. Thus, the invention provides a mechanism for automatic feedback correction of CRT convergence.

Still referring to FIG. 1, a delay circuit 14 is provided. This circuit is needed for equalization of delays because the deflection system and convergence system have inherently different bandwidths. The different bandwidths correspond to their different requirements for waveforms and are influenced by the deflection components on the CRT. Correction waveforms that the convergence system generates have a higher rate of change with more high frequency content than the deflection system. Because of this difference in bandwidths, there is a difference in group envelope delay between the two systems.

The deflection system will cause a beam to be placed into a particular spot at a particular time, when the beam is in that spot, convergence should be right for that spot. This would be true if the beam were positioned steady state, in one spot. However, in the transient conditions normally present in operation of a system, the beam deflects and arrives at a point of time different than the time at which the convergence waveforms arrive at the screen. For example, if the convergence waveforms are arriving at the output ahead of the deflection signals, convergence will be done for a point on the screen that has not yet been reached by the beam. That is, the convergence address will be for the wrong spot. In particular, the deflection system for a raster mode will be different than the delay inherent in stroke mode because the beam moves more slowly across the display screen for stroke (i.e., stroke mode has a slower writing rate than raster mode) so the difference in delay between deflection and convergence represents a small position error on the CRT screen. In order to have the convergence waveforms and deflection signals line up at the same position on the display screen, the group envelope delay of deflection and convergence systems must be equalized by addition of delay to the faster system. Convergence errors attributable to delay misequalization are usually accounted for by charging the convergence correction waveform. This only works if the display has a fixed writing rate.

In a hybrid display different writing rates between raster mode and stroke mode result in unequal convergence performance for raster or stroke. If delay is not equalized in the hybrid system, then switching from raster mode to stroke mode will introduce misconvergence problems as discussed above. One way to equalize the group envelope delay of the convergence and deflection channels is to build such requirements into the data stored in memory for the convergence waveform generation. That is, if the writing rate is fixed, the contents of memory could be shifted by a delay period corresponding to the writing rate to compensate for the timing differences. However, if the writing rate in the system is changed, as for example, from raster to stroke, the deflection signals and convergence waveforms will not be properly timed for the writing rate which was not compensated for in the data stored in memory. The invention solves this problem through the introduction of delay circuit 14 which equalizes the timing between the deflection system and the convergence waveform outputs so that the two signals will always occur in the proper position spatially on the display screen regardless of writing rate.

As provided by the invention, the fastest element of the convergence system, which, in one embodiment of the invention is the radial convergence system, is measured for the delay introduced by that system. The delay circuit 14 is then designed to equalize the difference between this delay and the delay of the deflection system. Those skilled in the art will also recognize that the system may need a different delay element for blue lateral which provides longer delay than the radial convergence delays.

The radial convergence circuits and the blue lateral convergence circuits 5 include interpolators 30. The interpolators take time to operate. In operation, the X and Y addresses are input simultaneously to the deflection system 12 and the radial and blue lateral convergence systems. The interpolator processes data 10 corresponding to the addresses. This processing takes time and is done at a known rate. It is possible that the delay for the interpolator processing may be longer than the delay inherent in the deflection system. This is the case as shown in FIG. 1. In this illustrative example, delay must be added to the deflection system such that the address which corresponds to position on the display screen appears at the screen at the same time that the output of the convergence system corresponding to the same screen addresses appears (i.e. is written to the screen).

Those skilled in the art will recognize that the timing delays in some systems which incorporate the invention may be such that the deflection system delays will be longer than the convergence system delays. In such cases, an appropriate delay would be introduced into the convergence system to equalize the timing between deflection and convergence signals. The important factor is to equalize the delay between the two systems. Once this factor is understood, it may be implemented by standard analog delay lines or, in the case of the digital convergence waveforms, through a delay timing circuit utilizing well-known latches, clocks and/or other gating schemes. The length of the delay will depend upon the type of memory device selected and its associated clocking rates. In practice such delays will typically be on the order of hundreds of nanoseconds.

Figure 2:
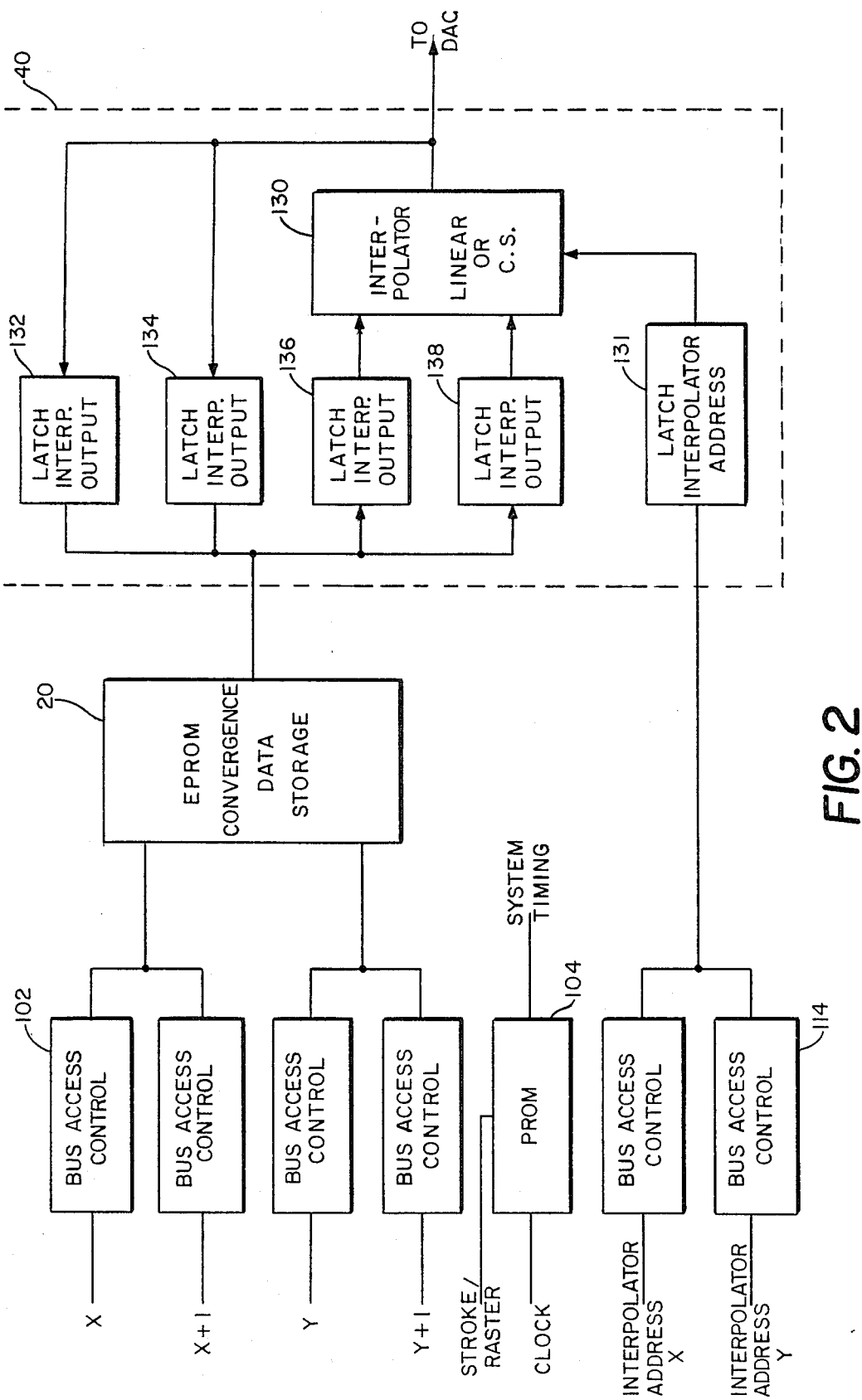
FIG. 2 schematically shows a more detailed block diagram of the memory and interpolator of the memory mapped deflection correction system of FIG. 1.

Referring now to FIG. 2, a more detailed block diagram of the portion of a typical functional electronic block 5 including the memory means 20 and the interpolation means 40 is shown. A plurality of bus access controllers 102 are provided to receive digital address data for the X, X+1, Y, Y+1, and the interpolate X and interpolate Y addresses. In one embodiment of the convergence state machine as shown in FIG. 2, the X, X+1, Y and Y+1 positional information address data is contained in the top 7 bits of 11 bit words. Memory means 20 may conveniently be an EPROM such as a $128 \times 128 \times 8$ or $64 \times 64 \times 8$ storage device, or equivalent, depending upon the application and number of sampling points being stored. As shown in FIG. 2, the interpolation means 40 includes a plurality of latches which may be advantageously packaged into an integrated circuit. If linear interpolation is to be done for stroke or raster modes, it is preferable that interpolation means 40 have at least four such latches including two output latch circuits shown as 132 and 134, and two latch input circuits 136 and 138. The actual interpolation processing is done by interpolation processing means 130.

In FIG. 2 the basic address system common to all the convergence system components is shown. Out of the basic (X,Y) address which indicates the electron beam position on the screen, the seven most significant bits are stripped for the basic convergence address. The four lesser significant bits are available as interpolation addresses for the linear interpolator. Interpolator addresses for X and Y are received through bus access controls 102 as shown in FIG. 2. In the raster mode, only the Y interpolation address is used (provided the scan is in the x direction). The X values are automatically interpolated by the hardware (time domain) reconstruction filter which is shown here as part of the convergence output amplifier. Each basic X address is incremented by 1 after each convergence sample value is outputted in a special circuit so the memory always has a pointer to both X and Y data values needed for the interpolation. If time permits, the interpolation function could be done by a multiplying accumulator.

FIG. 2 also shows the basic architecture of a convergence state machine. Each of the four convergence drivers is the same so only one will be discussed. A master clock and PROM 104 step the state machine through a series of data accesses and computations according to the mode (raster or stroke) of the convergence system. Busses 114 at the input and output of the convergence memory allow data to be moved to and from the interpolator to perform the required sequence of operations to compute each convergence value.

The system timing PROM 104 produces enable pulses to step the convergence generator through a series of operations according to the mode selected. For raster mode the required order of operations is:

1. latch deflection address,
2. retrieve convergence data at (x,y),
3. retrieve convergence data at (x,y+1),
4. gate interpolation y address (may only need to be done once per line),
5. gate interpolator,
6. repeat.

The frequency of sample outputs produced by the linear interpolation, which must be produced to meet the Nyquist sampling theorem requirements and produce accurate unbiased convergence outputs, depends upon the band limit of the power spectrum of the convergence correction waveforms. This band limit depends upon the writing rate of the display as well as the shape of the required convergence corrections. For one embodiment a sampling rate of at least 466 nsec is required.

Figure 3:
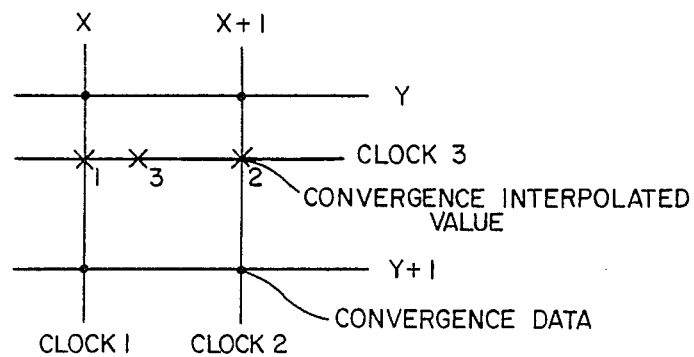
FIG. 3 pictorially represents the operation of linear interpolation as employed by one embodiment of the invention.

For stroke mode, the order of operations is shown pictorially in FIG. 3. Here the first interpolation is designated by $X_1$, the second interpolation by $X_2$ and the final interpolation (between the values calculated in $X_1$ and $X_2$) by $X_3$. The specific order of operation is:

1. latch deflection address,
2. retrieve the convergence data at (X,Y),
3. retrieve the convergence data at (X,Y+1),
4. move the y interpolate address to the interpolator,
5. gate the interpolator, store the result ($N_1$),
6. retrieve the convergence data at (X+1, y),
7. retrieve the convergence data at (X+1, y+1),
8. gate the interpolator, store the interpolator result (N2),
9. retrieve $N^1$,
10. retrieve N2,
11. move the X interpolate address to the interpolator,
12. gate the interpolator and output the results to the convergence DAC,
13. repeat.

As with the raster condition, the frequency of sample outputs depends upon the convergence waveform requirements and the writing rate. In one embodiment of the invention, the stroke mode writing rate is much slower than the other writing modes and consequently samples are produced at about 1.2 microsecond intervals.

A special mode may be required for stroke written background information where allowable convergence errors which may be caused by reconstruction errors are greater. In one embodiment, this information was written at 120,000 inches per second. If conventional stroke order of operations were used, significant misconvergence could result. This can be prevented by allowing for this mode as a separate condition which operates like raster, but reads out the data appropriately for the stroke written condition.

Referring to FIG. 3, the system for synthesizing stroke convergence signals is shown. Because stroke information can occur at any writing rate and in any direction, one embodiment of the present invention includes a method of processing the data which provides anti-aliasing filters in both the X and Y directions. This is done numerically because the time domain filter which automatically performs this operation in the raster mode requires a different bandwidth for every writing rate. One method used by the present invention interpolates convergence data in three steps. First, the data is interpolated vertically at two adjacent horizontal positions shown as $X_1$ and $X_2$ in FIG. 3. Then the results of these interpolations are interpolated horizontally to give the output value shown as $X_3$ in FIG. 3. The foregoing example uses simple linear interpolations so data from only four locations is required from the convergence data storage array in memory means 20.

Figure 16:
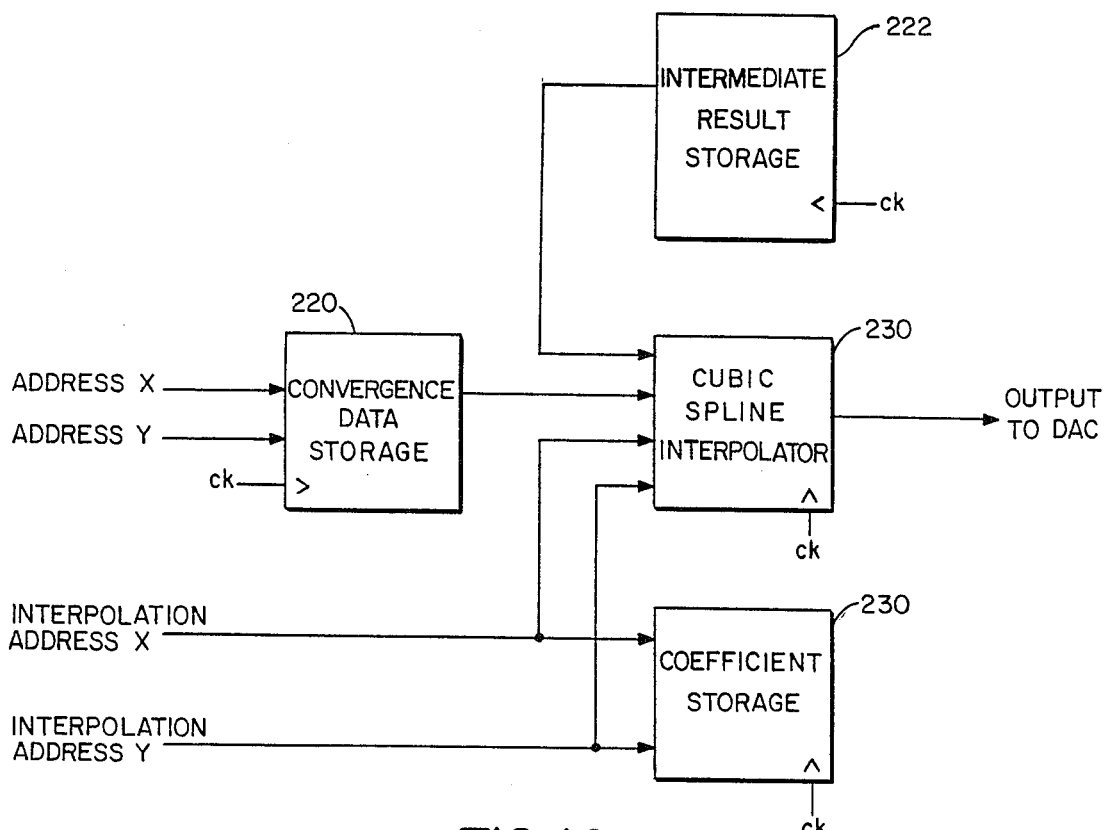
FIG. 16 shows a block diagram of a cubic spline interpolator which may be employed by the invention.

The use of linear interpolation provides a numerical method of waveform reconstruction which is equivalent to a filter whose frequency domain passband rejects the sampling antifacts according to a $Sinc^2$ (f) relation instead of a Sinc (f) relation. This steeper rejection characteristic reduces the amount of memory required because the spacing between the fundamental and its images is inversely proportional to the number of samples stored. A steeper reconstruction characteristic allows more closely spaced images in the frequency domain and, thus, fewer samples. A steeper reconstruction filter $[(Sinc^4 f)]$ can be realized using cubic spline interpolation and, therefore, fewer still memory locations would be required than are required using linear interpolation. Thus, one of the benefits of the present invention, minimization of storage needed for memory is realized through this technique. Note that if cubic spline interpolation were used, 16 data points would be required as input to the interpolator as illustrated in FIG. 11. A method of implementing such a cubic spline process is shown in block diagram form in FIG. 16.

Raster Convergence Signal Synthesis System

Figure 4:
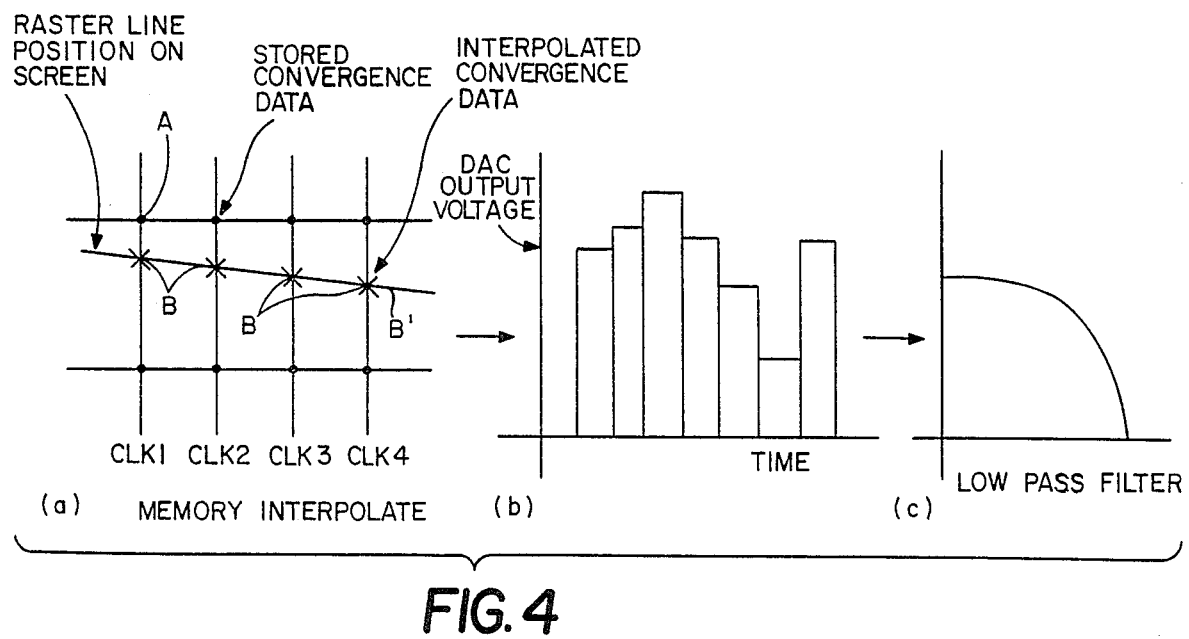
FIG. 4 pictorially shows one method of producing convergence data for a raster display using the apparatus shown in FIG. 2.

FIG. 4 pictorially shows a method of producing convergence signals for a raster display with the circuit configuration shown in FIG. 2. Generally, the technique is to oversample horizontally in the direction of the very high writing rate and interpolate vertically to reduce the amount of stored data. The reconstruction filters required for the horizontal direction use a combination of zero order interpolation, which is inherent in the digital to analog conversion means 40, and an analog low pass filter which is inherent in amplifier means 50 as shown in FIG. 1.

Still referring to FIG. 4, graph 4(a) shows the stored convergence data, sample values A occurring at clock times 1-4, respectively. Vertically interpolated values are denoted by points B, which define the convergence values along the line B'. The interpolated points are then fed into the digital to analog conversion means 40. Chart 4(b) shows graphically an example of the output voltage of the digital to analog conversion means. Finally, the output of the digital to analog converter is fed into a low pass filter (which is inherent in output amplifier means 50) and the reconstructed convergence signal is output to the radial and blue lateral convergence assemblies as indicated in FIG. 1. In order to optimize reconstruction of the convergence signal, the low pass filter 3 db point must be decreased if the writing rate is decreased. One can express the filter requirements in accordance with the following equation:

$$\frac{\text{Spatial Frequency (Cycles)}}{\text{inch}} \times \frac{\text{Writing Rate (Inches)}}{\text{second}} = \frac{\text{Time Domain Frequency (Cycles)}}{\text{second}}$$

The convergence requirements for a display depend upon the position of the electron beam. Therefore, the convergence signal requirements are most directly expressed as a function of a spatial variable. It follows that in the frequency domain, the units of frequency are cycles per inch. But the electrical signals which drive the convergence assembly are generated in time. The above equation expresses conversion from spatial frequency to time frequency. As one can see, when the writing rate is constant, there is a constant requirement for a reconstruction filter bandwidth. This is the case for the raster condition. For the stroke condition, the writing rate may not be constant and in any event it is significantly different from the raster writing rate. Thus, a different (lower bandwidth) reconstruction filter is required. Just as the raster condition uses a combination of numerical filtering (zero order interpolation) and analog filtering, the strobe condition can accomplish the required reconstruction numerically using linear or cubic spline interpolation in conjunction with zero order interpolation, for example. This accomplishes a different time domain frequency bandwidth in response to the differing writing rates associated with raster and stroke conditions of operation of the display system.

Note that it is the combination of the properties of the digital to analog conversion means and the low pass filter within amplifier means 50 and shown graphically in FIG. 4 as chart 4(c) that are combined to operate as a reconstruction filter for the convergence system of the present invention.

For the raster condition, any aliasing which results as a consequence of the reconstruction process can be kept to a very low amount because of the excellent reconstruction filter characteristics which are easily achieved in a time domain (e.g., a common L, C, and R) filter. As a result, the number of samples required is minimized. Of course, the electrical low pass filter does nothing to anti-alias the vertical portion of the convergence correction signal because it is several orders of magnitude wider in bandwidth than is required to pass the images resulting from sampling of the vertical portion of the convergence signal. Therefore, either the number of samples vertically must be increased dramatically, or a different filter must be employed.

Figure 5:
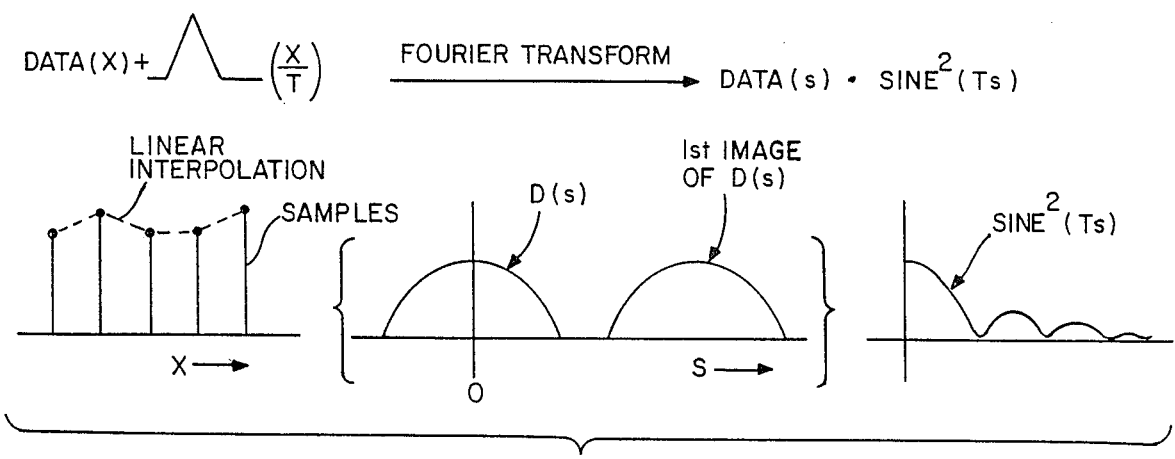
FIG. 5 graphically shows how linear interpolation enables reconstruction of convergence data by numerical filtering.
Figure 6:
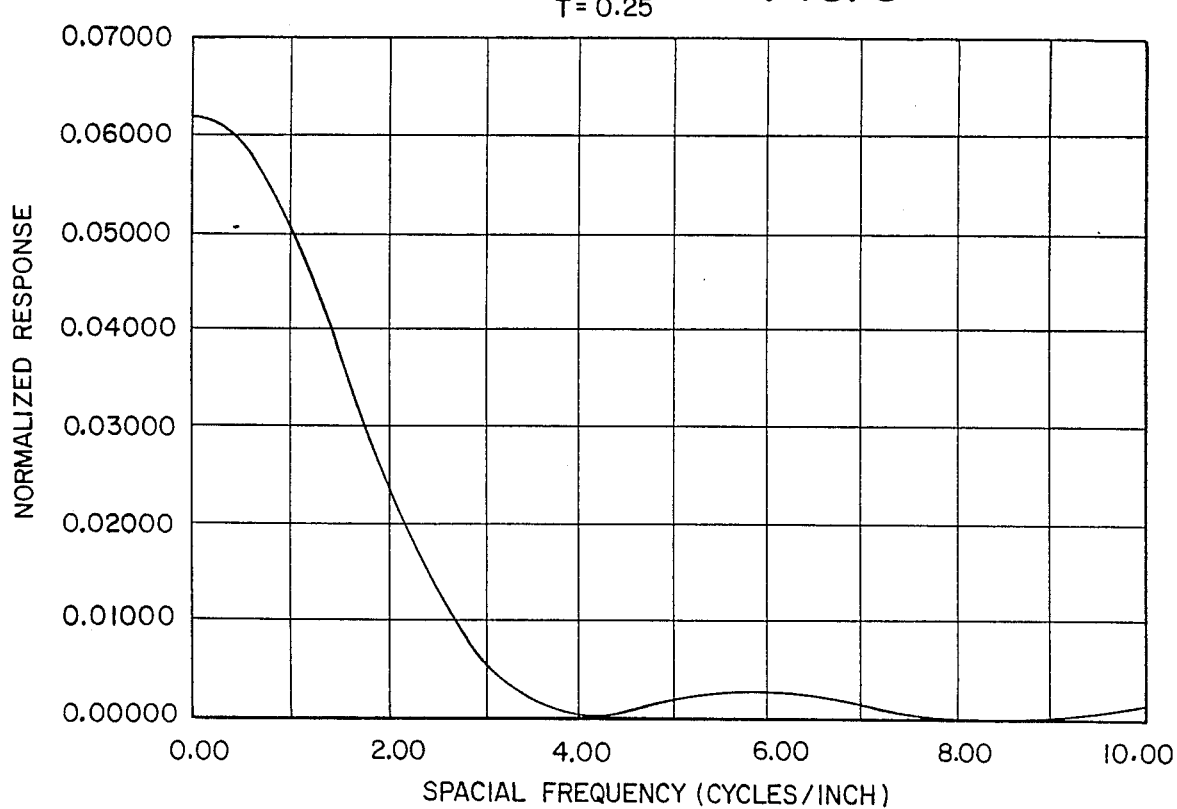
FIG. 6 graphically shows the spectral response of the low pass filter employed in the linear interpolation technique of FIG. 5.

The filter which is used in the apparatus of FIG. 2 for vertical reconstruction is a numerical filter and consists of a simple linear interpolator. Other filters could also be employed such as a cubic spline interpolator. The number of stored data values in convergence memory 30 required by a cubic spline interpolator would be reduced by approximately a factor of four because of steeper rolloff characteristics of the numerical reconstruction filter. The characteristics of a linear interpolator in the spatial domain are the same as convolving the sample data values with a triangle function whose base is 2 sample intervals wide (see FIG. 5). In the frequency domain this is equivalent to passing the sample data spectrum through a low pass filter whose response is shown in FIG. 5 and in greater detail in FIG. 6. Thus, the vertical portion of the raster convergence signal is anti-aliased by the interpolation between sample values vertically. The bandwidth of the input signal together with the characteristics of the reconstruction filter determine the number of samples which must be stored. The problem of determining the input signal bandwidth is discussed in more detail below.

Conventionally, the convergence signal is considered to be the superposition of a set of correction functions. The particular functions selected are chosen for convenience of interpreting convergence inputs and to meet the convergence waveform requirements with a minimum number of adjustments. Conventionally, these corrections functions are functions of screen position and are described by dc, ramp, parabolic, "B" and S terms on both horizontal and vertical axes plus corner correction terms. The amount of each signal is adjustable up to a maximum amount which is limited by the expedited maximum correction requirement. Since the Fourier integral is distributive over addition, the spectra contribution of each of these signals adds together. By addition of correction signals in proportion to their maximum contribution, spectral characteristics of the composite convergence signal can be estimated so that the number of samples required can be computed.

Computation of the output signal spectral characteristic depends upon the retrace interval waveform as well as the waveform during the active portion of the display. Failure to account for the contribution of the retrace interval of a raster signal will result in errors caused by aliasing on the convergence signals which, depending on their frequency, may show up on the right and left sides of the display.

Figure 7:
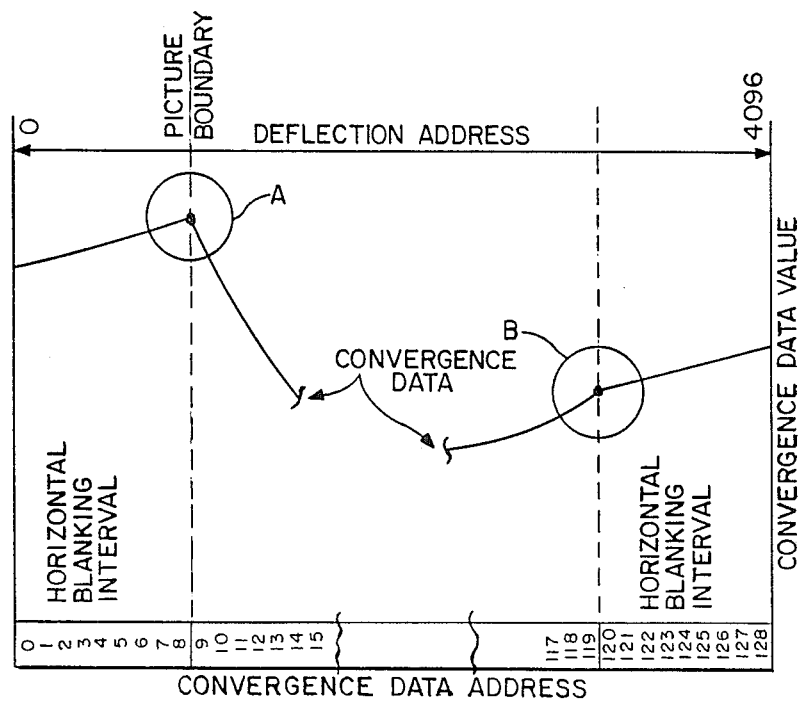
FIG. 7 is a graphic representation of the method employed by the present invention to construct the retrace interval signal by assigning stored convergence data during the horizontal blanking interval.

FIG. 7 shows the method used as part of the preprocessing done by the invention to construct the retrace interval signal as a part of the stored convergence data. In prior systems, the splicing of the left and right side of the convergence data as shown in FIG. 7 caused an abrupt transition as shown in circles A and B. This transition results in a large contribution to the spectral high frequency content of the composite correction signal, yet it contributes no improvement to the accuracy of the correction signals during the active portion of the display. The result is to greatly increase the required data storage. Instead of increasing the data storage, the invention computes the maximum required slope of the composite correction signal during the active portion of the display and uses this information to smooth the transitions which occur during the horizontal blanking interval.

Figure 8:
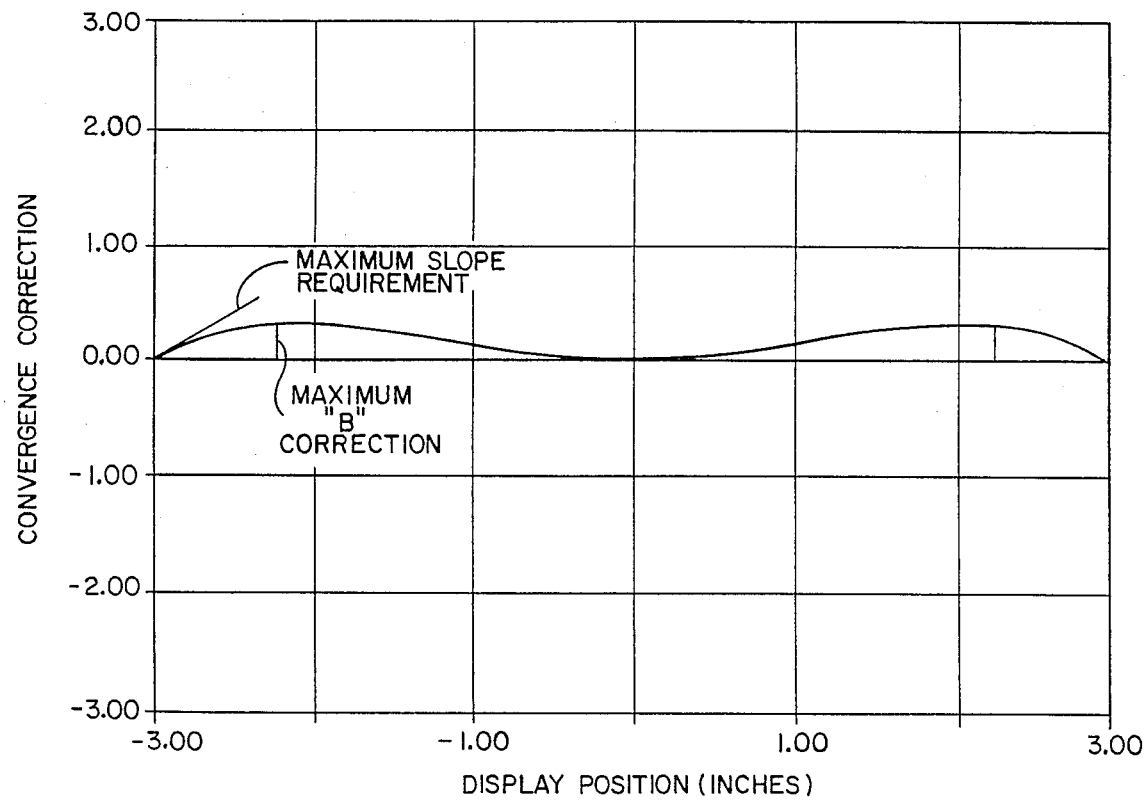
FIG. 8 is a graphic representation of a "B" convergence correction waveform in the spatial domain.
Figure 9:
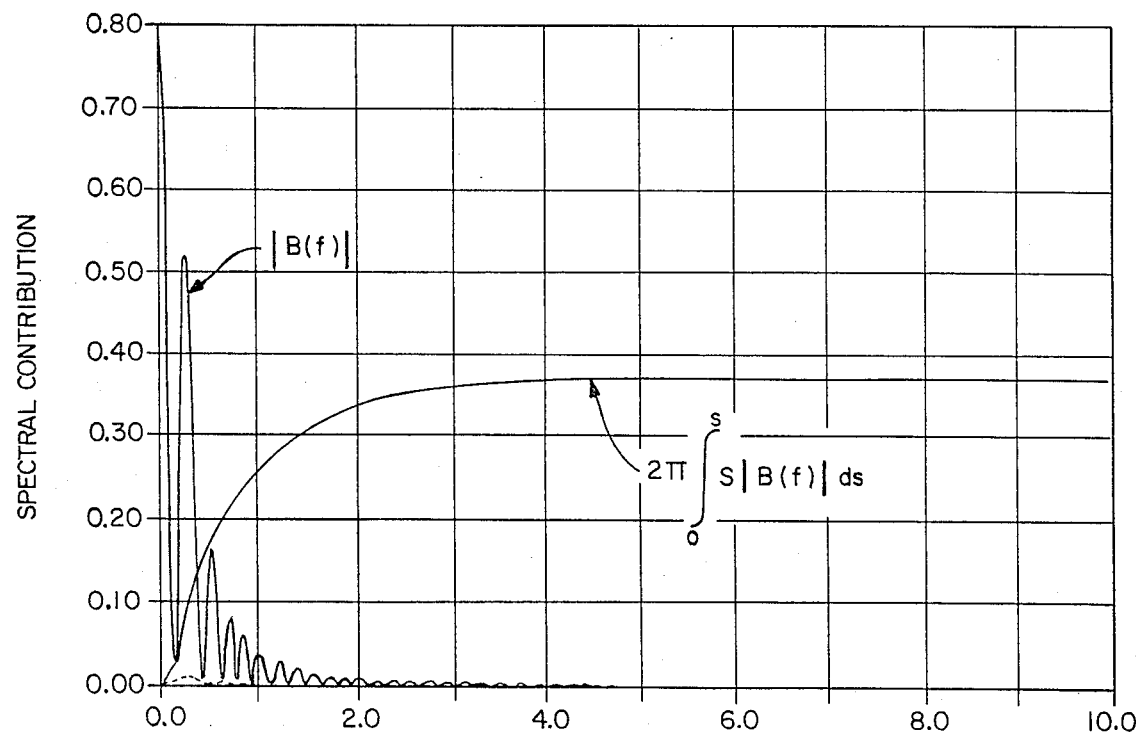
FIG. 9 is a graphic representation of the maximum slope calculation for the "B" correction waveform in the frequency domain when a smoothing formation is incorporated in the horizontal blanking interval.

Suppose, for example, that the greatest slope is expected to occur at $X=+/-3$ on the "B" correction signal as shown in FIG. 8. The spectrum of the "B" correction signal, includes the truncation of the "B" signal at its ends, which s not representative of the actual correction requirement, that is, the truncation of the signal produces high frequency artifacts which do not represent the actual convergence signal requirement. One way of dealing with this is to band limit the truncation of the signal under consideration by passing it through a filter. The bandwidth of this filter is selected so as to pass the highest frequency components which are active on the display surface. One way of eliminating this is to use the relation between the area of the power spectrum of a signal and its derivative. The derivative of the signal is equivalent to multiplying that signal's spectrum by $2\pi S$. Thus, a limit condition on slope is established by the area of the spectrum of a signal weighted by its frequency as shown in FIG. 9 for the "B" convergence correction signals. In FIG. 9, a filter (numerically equivalent to convolution with $$\frac{1.0}{0.221} e^{-x^2/(0.221)^2}$$

has been applied in addition to "[B(s)]" such that the integral value indicated is asymptotic to a particular value. This value and the filter characteristic used are determined by the maximum slope requirement of the correction signal derived in this example as shown in FIG. 8. This operation preserves convergence waveform integrity while limiting the spectral effects of system discontinuous functions.

The retrace interval construction contains extra high frequency content attributable to the transitions indicated at A and B in FIG. 7. Applying a spatial low pass filter to the data so as to limit the high frequency content of the data to the maximum required for correction during the active portion of display as shown in FIG. 9, results in a smoothing of the convergence sample values in the vicinity of the retrace transition. This smoothing can be seen as highlighted by circles A and B in FIG. 10. Application of such a filter will dramatically limit the number of samples which must be stored. An additional benefit of band limiting the data is that the slew rate required for the output amplifier 50 is minimized, thereby reducing the voltage and power needed for the amplifier. This processing is done in the external computer prior to storing the data in the on-board memory using conventional digital signal processing techniques.

Figure 17:
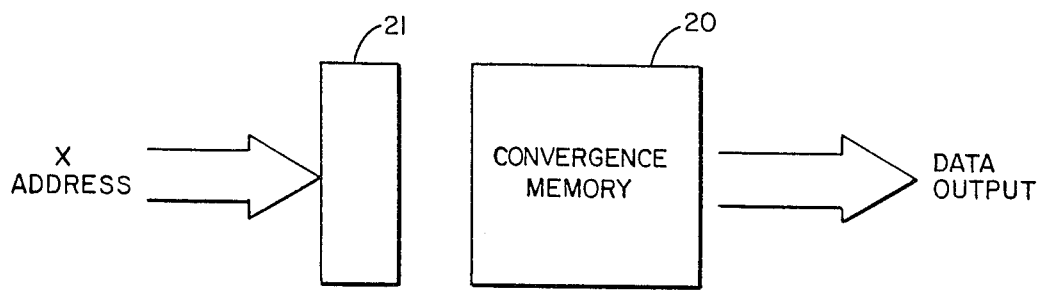
FIG. 17 shows schematically the memory mapping process of the invention.

Yet another alternative method as used by the present invention for obtaining the necessary convergence data antialiasing is to finely divide the screen into a sufficient number of discrete elements so as to provide accurate convergence data without additional processing. The number of samples selected for storage in convergence memory is determined by the band limit of the convergence signals and the selected reconstruction function. In addition to this error attributable to sampling, another error, attributable to quantization of the sample values, limits the output signal accuracy. Thus, if an interpolator produces results which differ from the surrounding samples, which are used in the interpolation process as inputs, by less than one bit, the interpolation does not contribute a useful output. Empirically, the samples used to construct the convergence signals are only significant to eight bits of accuracy. In the central regions of the display, the output varies very slowly, and because of the density of samples and their quantized values, many closely spaced memory locations may contain the same value. This invention recognizes this commonality between convergence signal requirements by mapping memory to represent widely spaced areas in the central portion of the CRT and closely spaced areas in the corners and edges of the display. Sample values are repeated as necessary in the central regions in order that uniform sample spacing is maintained as if actual values were in memory at those location. FIG. 17 shows schematically how this is physically accomplished in one embodiment of the invention. The result is that memory appears to have many more samples stored in it than actually exist. This decreases the reconstruction filter requirements by utilizing a limited rate of change which exists in the convergence characteristic functions. This method is particularly useful for the highest writing rates since convergence sample values must be available to keep up with the position of the electron beam. If memory is mapped in sufficiently small elements, such a method requires that only a single value be retrieved from memory for any screen position. For more modest writing rates, there is sufficient time available to access four data points and, therefore, the amount of data storage memory required can be decreased if the time which is available is used as described above with reference to FIGS. 2 and 3. Finally, for leisurely stroke writing rates, cubic spline interpolation, which requires 16 data points to be retrieved from memory, can be used with much smaller memory requirements, typically ¼ of what is required for linear interpolation. These smaller memory requirements result because the memory samples can be spaced much further apart on the screen than is the case for linear interpolation. In the design of any particular display system, these tradeoffs must be weighed.

Figure 12:
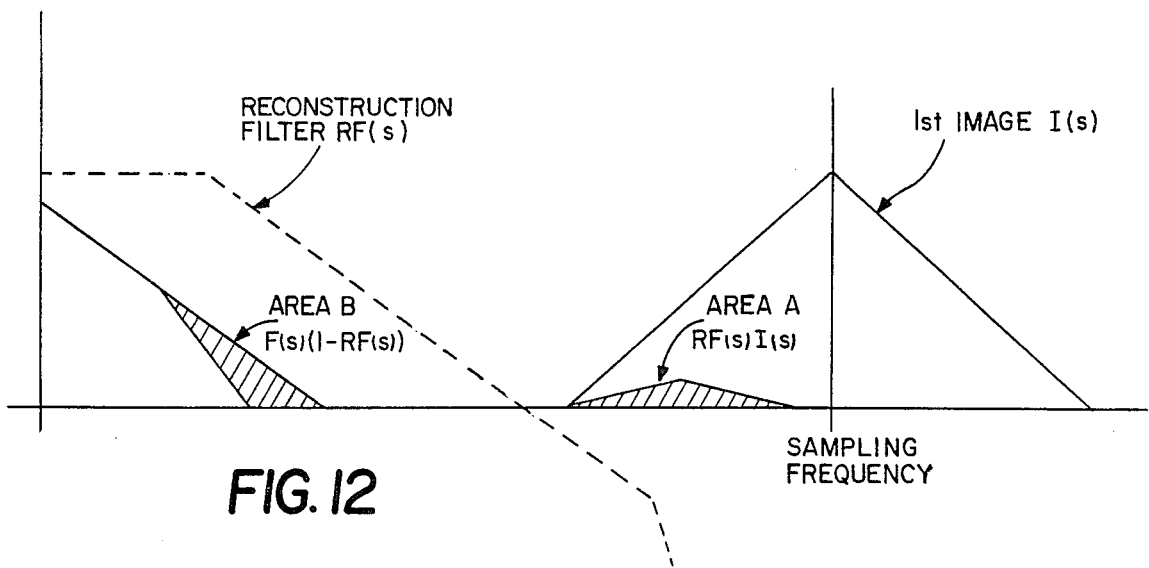
FIG. 12 is a graphic representation of errors caused by reconstruction filter characteristics.

The basis for decided how much memory is required for a particular approach or system, i.e., direct data, linear interpolation or cubic spline interpolation, is based upon an analysis of the errors which will be contributed from finite data word size and aliasing caused by different reconstruction filter characteristics. These errors are bounded by the areas in the spectral domain as depicted in FIG. 12. Here the percent error contributed by the anti-alias filter is the sum of the area of the spectrum of the image which is not rejected, shown as area A in FIG. 12, plus the error in the reconstruction caused by attenuation of the signal baseband spectrum, shown as area B in FIG. 12, divided by the total area of the base spectrum if it were perfectly reconstructed and multiplied by 100.

Data Pre-Processing

An important feature of the present invention is the application of preprocessing techniques which, in combination with the on-board interpolation and convergence signal reconstruction means as shown, for example, in FIG. 1, enable memory storage requirements to be minimized while at the same time simplifying the convergence adjustment process for the user. In arriving at these pre-processing techniques, consideration must be given to (1) convergence spectral requirements, (2) digital convergence sampling requirements, and (3) interaction between convergence adjustments which are often present in the form of crosstalk between the various color convergence axes.

Crosstalk

Figure 15:
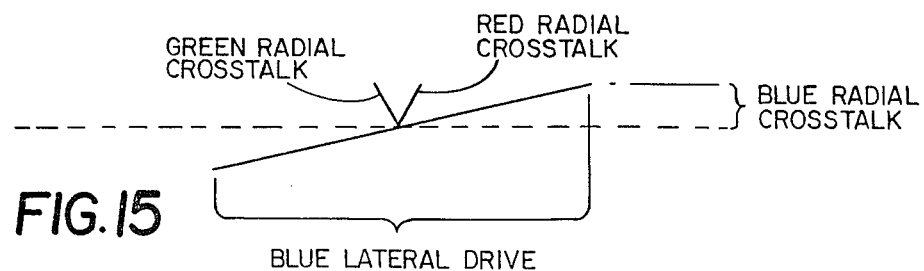
FIG. 15 is a graphic representation of convergence crosstalk into red, green and blue radial convergence when the blue lateral assembly is driven.

FIG. 15 shows a graphical representation of the convergence crosstalk for the blue lateral to the radial convergence assembly for a delta gun color CRT. It is important to note that the blue electron gun trace is not only deflected horizontally. Instead, it is tipped by interaction of the blue lateral with the blue radial convergence assembly. Also, the crosstalk to the red, green and blue radial channel from the blue lateral is approximately equal. Table I lists the average value of crosstalk for all measurements made on two sample CRTs and their convergence assemblies.

TABLE I

| Driven Convergence Assembly | Interacting Convergence Assembly | Frequency (kHz) | Tektronix CRT (%) | Matsushita CRT (%) |
|---|---|---|---|---|
| Blue Lateral | Red Radial | 10 | 12.6 | 17.2 |
|  |  | 100 | 27.7 | 28.1 |
|  | Green Radial | 10 | 11.28 | 17.2 |
|  |  | 100 | 20.75 | 25.1 |
|  | Blue Radial | 10 | — | 18.3 |
|  |  | 100 | — | — |
| Blue Radial | Red Radial | 10 | 12.25 | 15.44 |
|  |  | 100 | 24.61 | 22.4 |
|  | Green Radial | 10 | 11.25 | 11.27 |
|  |  | 100 | 23.25 | 17.51 |
| Green Radial | Blue Radial | 10 | 12.58 | 9.47 |
|  |  | 100 | 25.71 | 11.43 |
|  | Red Radial | 10 | 11.95 | 9.71 |
|  |  | 100 | 20.94 | 13.77 |
| Red Radial | Blue Radial | 10 | 13.2 | 15.13 |
|  |  | 100 | 21.9 | 20.52 |
|  | Green Radial | 10 | .9 | 14.78 |
|  |  | 100 | 22.3 | 21.49 |
| Average Interaction |  | 10 | 12.13 | 14.27 |
|  |  | 100 | 23.4 | 18.89 |

These measurements demonstrate that within the CRT and convergence assemblies, crosstalk will cause interaction between the convergence adjustments even though the inputs to the convergence assemblies are independent one from another. This crosstalk is a known amount for any given CRT assembly. Therefore, the computer used to compute the convergence values which will be stored in memory can predict that, for example, referring to Table I for a Teletronix CRT, when red radial convergence adds horizontal parabolic correction of delta X, the blue radial convergence will also experience a horizontal parabolic input of 0.132 time delta X and the green radial convergence will receive a horizontal parabolic input of 0.009 times delta X. The blue lateral assembly will get a horizontal parabolic input of 0.12 times delta X. These inputs can be subtracted from the parabolic correction already planned for each of the convergence assembly horizontal parabolic corrections. Suppose Blue radial convergence used Y horizontal parabolic correction before delta X were input to the red radial horizontal parabolic correction. Before the value for blue radial was added to memory, a new correction equal to Y-0.132 times delta X would be computed for blue radial even though the input to the system was a correction to red radial. Similar action would be taken for green radial and blue lateral. This pre-correction for crosstalk would cause the convergence assembly to appear to the person accomplishing the convergence adjustment to have very slight interaction between adjustments compared to a conventional convergence adjustment system.

Memory Organization

For a particular implementation there is a total allowable misconvergence for a given region of the CRT screen. The convergence performance is typically worst at the corners and edges of the screen. The sources of misconvergence include: (1) change in position of the CRT with respect to the earth's magnetic field, and (2) imperfect initial alignment wherein sample values are not completely accurate due to inability to observe very small misconvergence effects and quantization errors associated with finite sample word size in convergence memory. By considering the maximum allowed misconvergence between samples and the maximum obtainable rate of change of the input waveform, the minimum distance between samples on the face of the screen can be estimated. Because the computation of convergence values must be done serially in time, the speed of motion of the electron beams affects the allowable amount of time between samples. For a particular embodiment 3 mils of misconvergence could occur in 0.0899 inches. Thus, for a raster display with a writing rate of 193K inches/second, 0.0899 inches of electron beam motion corresponds to 466 ns. At a writing rate of 34K inches/second 0.0899 inches corresponds to 2.64 microseconds. It is difficult to achieve the computation speed required by very high writing rate displays. The highest writing rates are usually for raster conditions. Raster formats have constant, known writing rates which can be used to reduce the calculations required provided memory is appropriately organized. Such a memory organization would take advantage of the regular interval spacing of the samples in the raster format to minimize computation but use the extra time available in the stroke mode to interpolate between samples and thereby improve convergence performance by minimizing aliasing errors.

Figure 13:
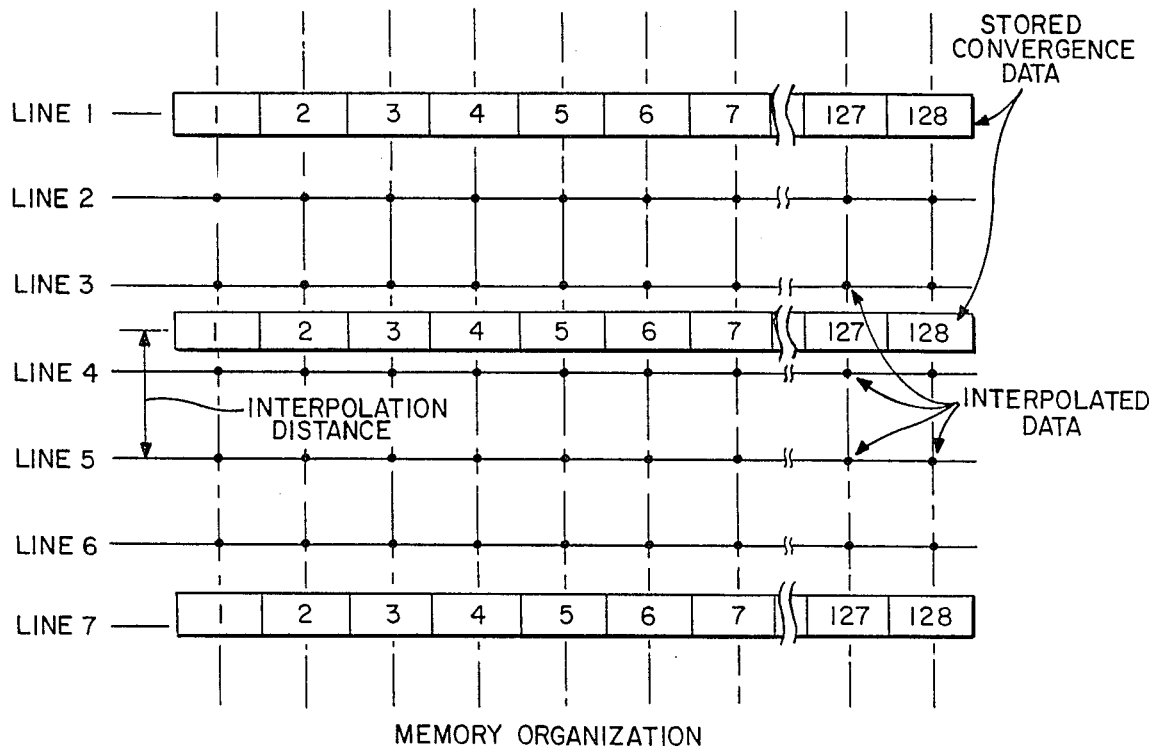
FIG. 13 schematically shows one scheme for memory organization for linear interpolation implementation.

FIG. 13 shows the memory organization planned for the linear interpolation implementation. In contrast, cubic spline interpolation would require ¼ the memory. In the FIG. 13 example of linear interpolation, 128 samples horizontally by 128 samples vertically are required for 2% maximum reconstruction errors. The reconstruction filter would be part of the output amplifier of the convergence system and would need to be at least 2 pole with a 328 kHz −3 dB point. Note that stored convergence data as shown in FIG. 13 does not necessarily lie on a scan line. In the raster mode, sample values are interpolated vertically according to the vertical digital address using the system shown in FIG. 2. This system implements the interpolation relation $$N_3 = N_1 + (N_2 - N_1) x$$

where
 x = interpolation subaddress,
 $N_1$ = first data value,
 $N_2$ = second data value,
 $N_3$ = interpolated result.

The system shown in FIG. 2 may use a look-up table stored in a PROM to do the required multiplication instead of a multiplier. In order to use a look-up table, a positive address must always be used, so a system for ordering the inputs to force a positive address must be employed with a sign change in the output ALU.

Software Requirements for Digital Convergence

The digital convergence system of the invention interpolates convergence data stored in memory means to generate analog convergence drive signals for magnetic convergence assemblies on the CRT. The task for software is to fill the convergence memory means with preprocessed data. This data becomes a part of the CRT assembly, much the same as a "pot farm" is the convergence data for an analog convergence system. The intent is to provide the intelligence for interactively changing the convergence in a "smart" CRT test set. The software system of the invention performs computations based on convergence constants input by a technician who is observing the convergence condition of the CRT. These computations provide new data for the convergence RAM or EPROM in the digital convergence system. The convergence constants are interactively adjusted by the technician to achieve system convergence.

Since different amounts of correction may be required in different quadrants of the display, it is convenient to divide the adjustments up by quadrant as shown in FIG. 14. The selected correction terms are a linearly independent set because they can be adjusted with minimal interaction provided they are adjusted in the order: "DC, parabola, corner correction, 'B'" while determining the amount of required correction at the locations shown. Since the convergence data placed in memory means is the superposition of all these terms, their contributions must be summed into polynomials as shown below:

First Quadrant Polynomial
Correction = $P_1*X^2 + C_1*X^2*Y^2 + P_3*Y^2 + Q_1*(X^2/9 - X^4/81) + Q_3*(Y^2/9 - Y^4/81) + D$
Second Quadrant Polynomial
Correction = $P_2*X^2 + C_2*X^2*Y^2 + P_3*Y^2 + Q_2*(X^2/9 - X^4/81) Q_3*(Y^2/9 - Y^4/81) + D$
Third Quadrant Polynomial
Correction = $P_1*X^2 + C_3*X^2*Y^2 + P_4*Y^2 + Q_1*(X^2/9 - X^4/81) + Q_4*(Y^2/9 - Y^4/81) + D$
Fourth Quadrant Polynomial
Correction = $P^2*X^2 + C_4*X^2*Y^2 + P_4*Y^2 + Q_2*(X^2/9 - X^4/81) + Q_4*(Y^2/9 - Y^4/81) + D$ The computer program of one embodiment of the current invention is required to accept as input 13 operator adjustment variables (per convergence channel) and produce as output 128 rows of convergence data with 128 values per row which can be used to fill the convergence data memory means.

This invention has been described herein in considerable detail in order to comply with the Patent Statutes and to provide those skilled in the art with the information needed to apply the novel principles and to constructed and use such specialized components as are required. However, it is to be understood that the invention can be carried out by specially different equipment and devices and that various modifications, both as to the equipment details and operatinq procedures, can be accomplished without departing from the scope of the invention itself.

What is claimed is:

1. A memory mapped deflection correction system for a color CRT imaging system using proprocessed digital information which has been precorrected for crosstalk between convergence assemblies wherein the CRT includes a display screen, and a deflection system comprising:
 (a) memory means for storing the preprocessed digital information according to X,Y addresses corresponding to display screen positions;
 (b) means for interpolating the stored digital information into digital convergence correction information;
 (c) means for converting the digital correction information into analog electrical signals;
 (d) means for filtering the analog electrical signals so as to provide convergence correction signals; and
 (e) means for equalizing the timing delays between the deflection system and the interpolation member so as to assure that information at a particular X,Y address is written to the display screen at the same time as the corresponding convergence correction signal.

2. The system of claim 1 further including a means for interfacing with an external computer.

3. The system of claim 2 wherein the preprocessed digital information is comprised of digital samples derived from observed convergence correction errors.

4. The system of claim 1 wherein the interpolation means comprises a means for applying linear interpolation to the stored digital information so as to reduce the amount of memory required to accomplish convergence with digital information.

5. The system of claim 1 wherein the interpolation means comprises a means for applying cubic spline interpolation to the stored digital information so as to reduce the amount of memory required to accomplish convergence with digital information.

6. The system of claim 1 wherein the memory means comprises an erasable read-only memory.

7. The system of claim 1 wherein the interpolation means implements the interpolation relation $$N_3 = N_1 + (N_2 - N_1)x;$$

where $x$ = an interpolation subaddress,
$N_1$ = a first data value,
$N_2$ = a second data value, and
$N_3$ = the interpolated result.

8. The system of claim 1 wherein the means for filtering comprises an amplifier inherently including a low pass filter.

9. The system of claim 1 wherein the memory means comprises
   (a) a plurality of bus access controllers which receive address data; and
   (b) an erasable read-only memory for storage of convergence sample values.

10. The system of claim 9 wherein the interpolation means comprises
    (a) a plurality of latches for storing intermediate results;
    (b) an interpolator; and
    (c) latched address means for receiving interpolated address information.

11. The system of claim 1 wherein the preprocessed stored digital information comprises the superposition of DC, parabola, corner correction and B correction waveforms at selected locations on the CRT screen.

12. The system of claim 11 wherein the selected locations on the CRT screen correspond to quadrants wherein the preprocessed stored digital information further comprises a linearly independent set of selected correction terms which are adjusted in the order of DC, parabola, corner correction and B.

13. A memory mapped deflection correction system for a CRT including a deflection system, a convergence yoke, a display screen and a plurality of color convergence axes comprising:
    (a) means for receiving preprocessed convergence correction signals from an external computer wherein the convergence correction signals include smooth transitions over the horizontal blanking interval and whereby the preprocessed convergence correction signals reduce memory requirements for the system;
    (b) memory means for storing the preprocessed convergence correction signals according to X,Y addresses corresponding to display screen positions;
    (c) a plurality of convergence circuits, each corresponding to a color convergence axis of the CRT and each of the convergence circuits comprising means for storing the preprocessed convergence correction signals in digital format, means for interpolating the convergence correction signals, means for converting the interpolated signals into analog convergence waveforms, and means for filtering and amplifying the analog convergence waveforms for each color convergence axis; and
    (d) means for equalizing the timing delays between the deflection system and the plurality of convergence circuits information at a particular X,Y address is written to the display screen at the same time as the corresponding convergence correction signal.

14. The system of claim 13 wherein the color convergence axes include red, green and blue radial, and blue lateral axes.

15. The system of claim 13 wherein the CRT has a raster display mode with a vertical scan direction wherein the interpolation means comprises a linear interpolation for the vertical scan direction so as to further reduce the memory capacity required to accomplish convergence.

16. The system of claim 13 wherein the CRT has a stroke mode with vertical and horizontal scan address input wherein the interpolation means comprises linear interpolation in the horizontal and vertical scan directions so as to further reduce the amount of memory capacity required to accomplish convergence.

17. The system of claim 13 wherein the preprocessed convergence correction signals include precorrection factors for crosstalk between convergence circuits by preadjusting convergence correction values to account for crosstalk in the convergence yoke and convergence circuits.

18. The system of claim 13 wherein the CRT is a hybrid display with raster and stroke modes of operation.

19. The system of claim 13 wherein the interpolation means employs cubic spline interpolation.

20. A memory mapped deflection correction system including apparatus for feedback auto-correction of convergence for a color CRT imaging system using preprocessed digital information wherein the CRT includes a deflection system and a display comprising:
    (a) memory means for storing the preprocessed digital information according to X,Y addresses corresponding to display position;
    (b) means for interpolating the stored digital information into digital convergence correction information;
    (c) means for converting the digital correction information into analog electrical signals;
    (d) means for filtering the analog electrical signals;
    (e) means for equalizing the timing delays between the deflection system and the interpolation means information at a particular X,Y address is written to the display screen at the same time as the corresponding convergence correction signal;
    (f) means for measuring convergence errors on the CRT display; and
    (g) means for interfacing with an external computer whereby correction data can be introduced into the memory means.

* * * * *

UNITED STATES PATENT AND TRADEMARK OFFICE
CERTIFICATE OF CORRECTION

PATENT NO. : 4,871,948

DATED : October 3, 1989

INVENTOR(S) : Larry A. Nelson

It is certified that error appears in the above-identified patent and that said Letters Patent is hereby corrected as shown below:

Column 16, Line 49, delete the word "proprocessed" and replace it with -- preprocessed --.

Column 18, Line 52, delete the word "position" and replace it with -- positions --.

Signed and Sealed this

Fourth Day of September, 1990

Attest:

HARRY F. MANBECK, JR.

*Attesting Officer*        *Commissioner of Patents and Trademarks*